(12) United States Patent
Chen

(10) Patent No.: US 9,485,412 B2
(45) Date of Patent: Nov. 1, 2016

(54) DEVICE AND METHOD FOR USING PRESSURE-SENSING TOUCH SCREEN TO TAKE PICTURE

(71) Applicant: Chiun Mai Communication Systems, Inc., New Taipei (TW)

(72) Inventor: Pin-Wei Chen, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 34 days.

(21) Appl. No.: 14/531,364

(22) Filed: Nov. 3, 2014

(65) Prior Publication Data

US 2016/0065838 A1  Mar. 3, 2016

(30) Foreign Application Priority Data

Sep. 2, 2014  (CN) .......................... 2014 1 0442147

(51) Int. Cl.
*H04N 5/232* (2006.01)
*G06F 3/0488* (2013.01)
*G06F 3/041* (2006.01)
*H04N 1/21* (2006.01)
*G06F 3/0484* (2013.01)
*G06F 3/0482* (2013.01)
*H04N 101/00* (2006.01)

(52) U.S. Cl.
CPC ........ *H04N 5/23216* (2013.01); *G06F 3/0412* (2013.01); *G06F 3/0414* (2013.01); *G06F 3/0416* (2013.01); *G06F 3/0482* (2013.01); *G06F 3/04847* (2013.01); *G06F 3/04883* (2013.01); *H04N 1/2112* (2013.01); *H04N 5/23293* (2013.01); *G06F 2203/014* (2013.01); *G06F 2203/04105* (2013.01); *G06F 2203/04106* (2013.01); *G06F 2203/04808* (2013.01); *H04N 2101/00* (2013.01)

(58) Field of Classification Search
CPC .......... H04N 5/23216; H04N 1/2112; H04N 5/23293; G06F 3/04883; G06F 3/04847; G06F 3/0414; G06F 3/0412; G06F 3/0482; G06F 3/0416; G06F 2203/014; G06F 2203/04808; G06F 2203/04105; G06F 2203/04106
See application file for complete search history.

(56) References Cited

U.S. PATENT DOCUMENTS

| RE44,278 E * | 6/2013 | Yamagishi ......... H04N 5/23212 348/363 |
| 2014/0123080 A1* | 5/2014 | Gan ...................... G06F 3/0481 715/863 |
| 2015/0160794 A1* | 6/2015 | Huang .................. G06F 3/0482 715/810 |
| 2015/0296062 A1* | 10/2015 | Lee ........................ G06F 3/041 455/566 |

FOREIGN PATENT DOCUMENTS

| CN | 102223476 A | 10/2011 |
| CN | 103186328 A | 7/2013 |

* cited by examiner

Primary Examiner — Twyler Haskins
Assistant Examiner — Angel L Garces-Rivera
(74) Attorney, Agent, or Firm — Zhigang Ma

(57) ABSTRACT

A device uses a pressure-sensing touch screen to detect the pressure from a touch input on the touch screen. Based on whether the pressure is greater than a predetermined pressure value or not, and the type of the touch input, various picture-taking operations are performed.

13 Claims, 3 Drawing Sheets

DEVICE AND METHOD FOR USING PRESSURE-SENSING TOUCH SCREEN TO TAKE PICTURE

CROSS-REFERENCE TO RELATED APPLICATIONS

This application claims priority to Chinese Patent Application No. 201410442147.6 filed on Sep. 2, 2014 in the China Intellectual Property Office, the contents of which are incorporated by reference herein.

FIELD

The subject matter herein generally relates to picture-taking using touch screen device and, particularly, to a device and a method for taking pictures using a pressure-sensing touch screen.

BACKGROUND

Touch screen devices are widely used. Some types of touch screen displays can respond to the degree of pressure on the screen, which makes it possible to take advantage of this feature in a picture-taking process.

BRIEF DESCRIPTION OF THE DRAWINGS

Implementations of the present technology will now be described, by way of example only, with reference to the attached figures, wherein.

DETAILED DESCRIPTION

Figure 1:
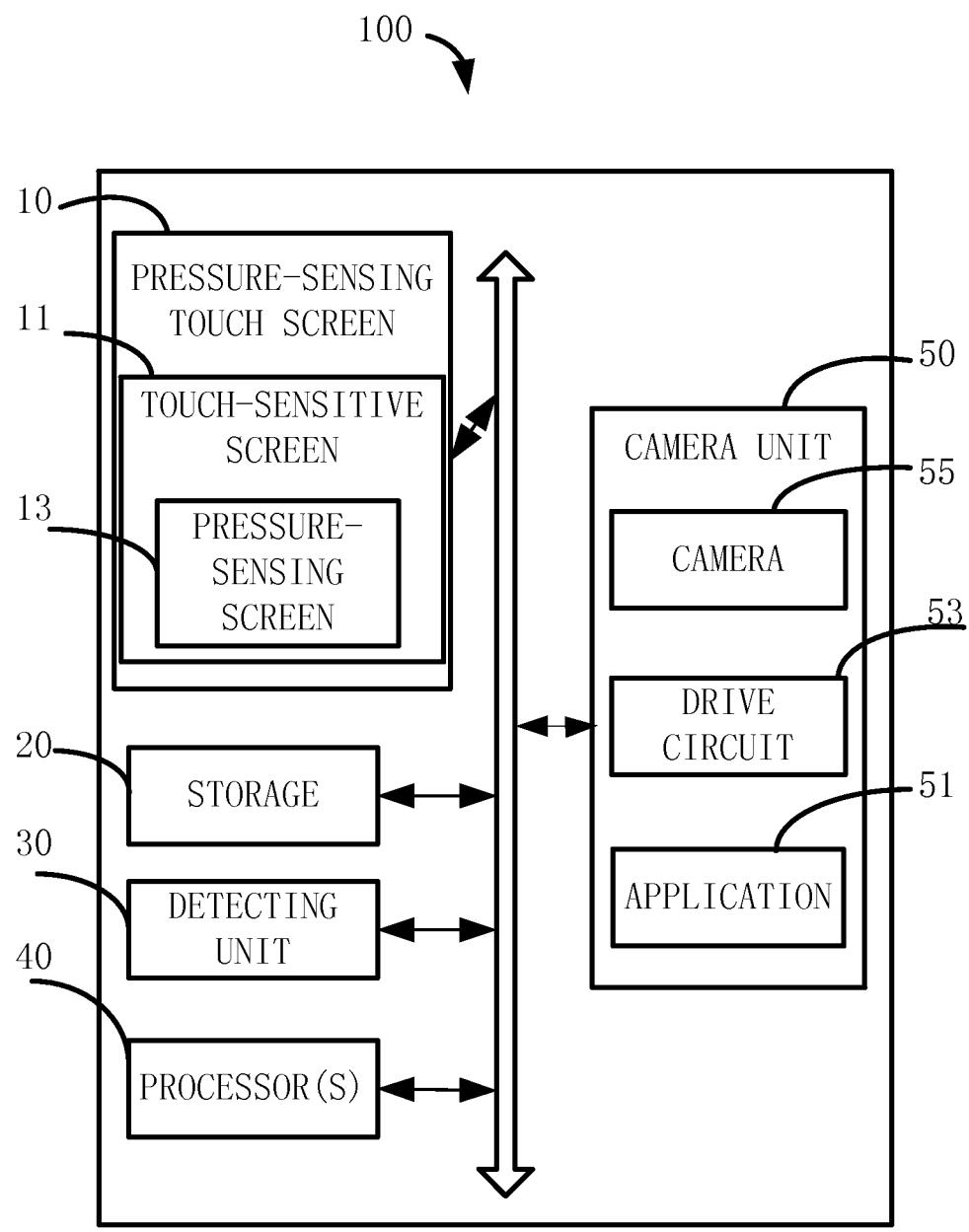
FIG. 1 is a block diagram showing functional blocks of a device with a pressure-sensing touch screen for taking pictures, in accordance with an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "touch input" is defined as any type of touch on a touch-sensitive display or a touch screen for the purpose of inputting instructions by the user, whether directly or indirectly through intervening objects. The term "processor" is defined as any type of general purpose processing unit or module, with either signal core or multi-core structure, or multiple connected processors. The term "comprising" means "including, but not necessarily limited to"; it specifically indicates open-ended inclusion or membership in a so-described combination, group, series and the like.

The present disclosure is described below in relation to the accompanying drawings and by way of example.

FIG. 1 illustrates a block diagram for a device 100 with a pressure-sensing touch screen, according to an embodiment. The device 100 includes a pressure-sensing touch screen 10, a storage (or memory) 20, a detecting unit 30, a processor 40, and a camera unit 50. The pressure-sensing touch screen 10 receives touch inputs from a user for instructions. The storage 20 stores a predetermined pressure value. The detecting unit 30 determines the pressure from a touch input and the type of the touch and feeds the determinations to the processor 40 The processor 40 controls the camera unit 50 to either focus, take a single shot or continuous shots, or display a related menu showing parameters for the user to set, according to the determination and whether the pressure from the touch input is greater than the predetermined pressure value or not and what type the touch input is. The device 100 can be, but not limited to, a tablet computer, a smartphone, or a mobile networked device with a pressure-sensing touch screen.

The pressure-sensing touch screen 10 includes a touch-sensitive screen (or a touch screen) 11 and a pressure-sensing screen 13. The touch screen 11 receives touch input from a user who touches the touch screen 11. Meanwhile, the pressure-sensing screen 13 detects the degree or magnitude (e.g., numeric measuring) of pressure of the touch input. In one embodiment, the pressure-sensing screen 13 includes a pressure-sensitive layer of carbon nanotubes for sensing the pressure from a touch input.

In one embodiment, the storage 20 can store a coordinates system mapping the touch screen 11 which is used to determine the type (or shape or trace) of the touch input by determining positions of a touch input on the touch screen 11. Using a coordinates system for determining the shape or trace of the touch input is a known technology to one skilled in the art, therefore, will not be elaborated in detail here. The storage 20 can further include a predetermined time period used to determine the duration of a touch input.

The detecting unit 30 determines the pressure value and the type of a touch input sensed from the pressure-sensing touch screen 10. In one embodiment, several types of touch input are detected and used. A "tap" is a light touch on the pressure-sensing touch screen 10 with a pressure value on the pressure-sensing touch screen 10 less than or equal to the predetermined pressure value stored in the storage 20 and its duration is less than the predetermined time period. A "pressure tap" is a tap on the pressure-sensing touch screen 10 with pressure greater than the predetermined pressure value and its duration is less than the predetermined time period. A "pressure slide (or swipe)" is a touch, for example, by dragging the user's finger on the pressure-sensing touch screen 10 with a pressure greater than the predetermined pressure value. A "press and hold" is a touch, for example, by pressing and holding the user's finger in the pressure-sensing touch screen 10 with pressure greater than the predetermined pressure value and with a duration longer than the predetermined time period.

The detecting unit 30, in one embodiment, uses the stored coordinates system to determine positions of the trace of a touch input, and draws a conclusion on whether the touch input a tap type or a slide type touch, and feeds the processor 40 with the conclusion, together with the comparison result on the pressure value of the touch input with the predetermined pressure value The processor 40 controls the camera unit 50 to act accordingly.

Figure 2:
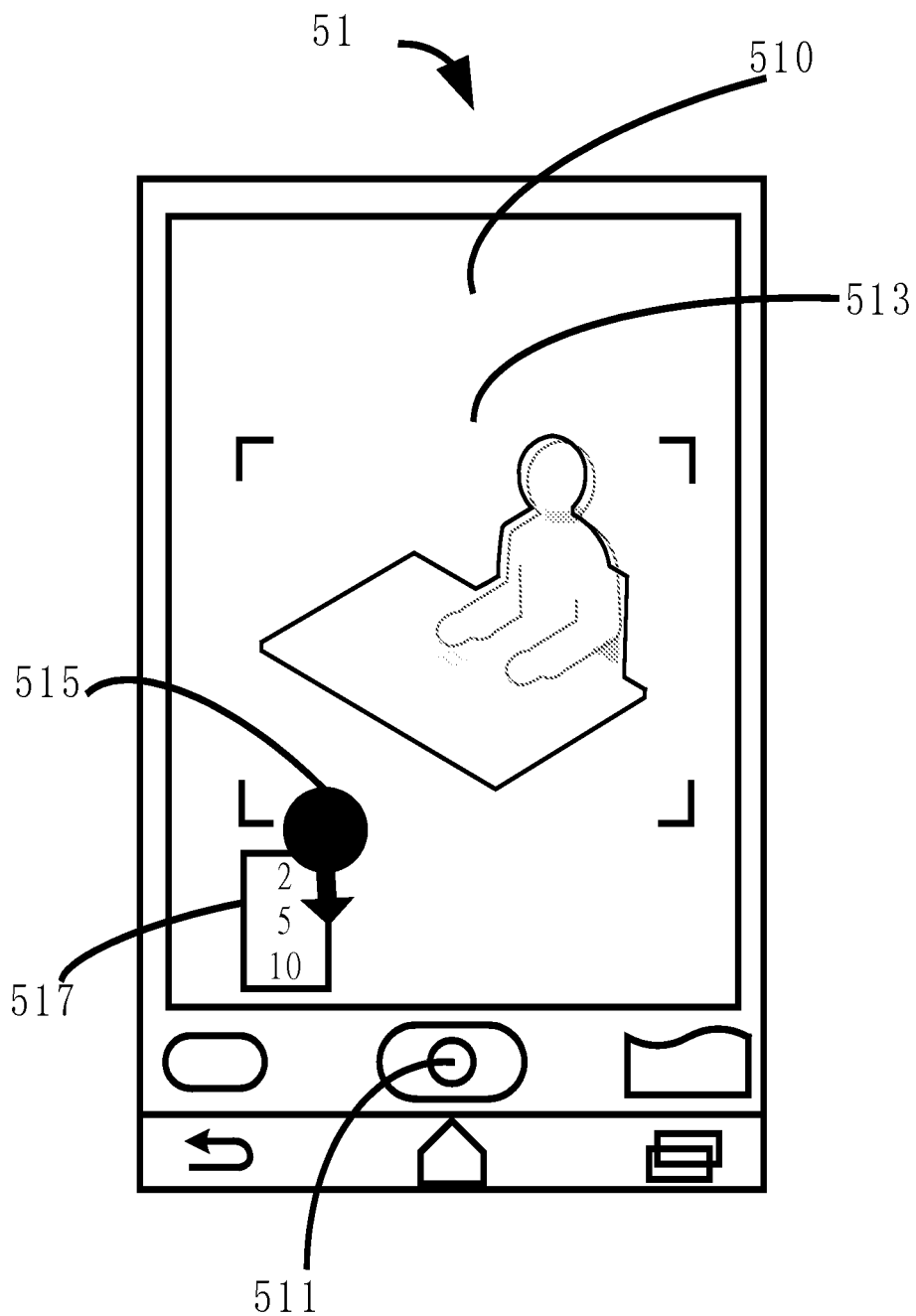
FIG. 2 is a diagrammatic view showing a user interface rendered by the device of FIG. 1, during an exemplary picture-taking process.

The camera unit 50 has a camera 55, a drive circuit 53 driving the camera, and an application or a program 51. The program 51 includes instructions stored in the storage 20 to be executed by the processor 40. Referring to FIG. 2, when the program 51 is executed by the processor 40, a user interface (UI) 510 is rendered on the pressure-sensing touch screen 10. The user interface 510 includes a shutter button 511, and a preview area 513 for reviewing an image before shooting the image. Both the shutter button 511 and the preview area 513 can receive touch input on the pressure-sensing touch screen 10. A detailed description of exemplary operations of the device 100 will be given below with reference to FIG. 3.

Figure 3:
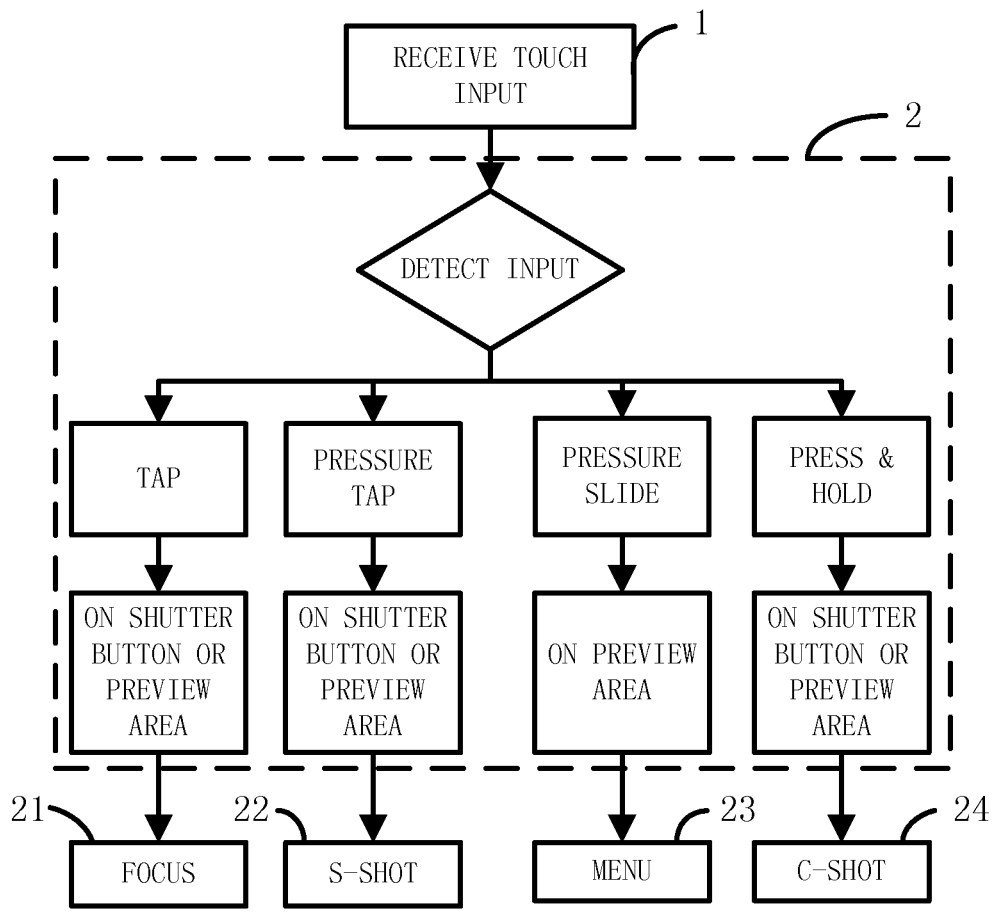
FIG. 3 is a flowchart showing an exemplary method of picture-taking using the pressure-sensing touch screen of the device of FIG. 1.

Referring to FIG. 3, a flowchart showing a method of picture-taking using the pressure-sensing touch screen 10 is presented in accordance with an example embodiment. The example method is provided by way of example, as there are a variety of ways to carry out the method. The method described below can be carried out using the configurations illustrated in FIGS. 1 and 2, for example, and various elements of these figures are referenced in explaining example method. Each block shown in FIG. 3 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method 300 can begin at block 1.

At block 1, the touch screen 11 receives a touch input on the pressure-sensing screen 10 from a user.

At block 2, the detecting unit 30 determines the pressure of touch input sensed by the pressure-sensing screen 13, and the type of the touch input, for example, according to the coordinates system stored in the storage 20. If the touch input is determined to be a tap received on either the shutter button 511, or the preview area 513, then the process goes to block 21, in which the processor 40 will control the camera unit 50 to focus on the object(s) the camera 55 is currently pointed at. If the touch input is determined to be a pressure tap, i.e., a tap with its pressure being greater than the predetermined pressure value, the process goes to block 22, and the processor 40 controls the camera unit to take a sign shot of the object. When the trace of the touch input is determined by the coordinates system as a slide or swipe on the preview area 513, and its pressure is further determined to be greater than the predetermined pressure value, i.e., being a pressure slide, meanwhile, the trace of the slide is determined in a predetermined direction, as detected by the coordinates system, for example in a downward direction as shown by a pressure slide 515 in FIG. 2, then, in block 23, a menu 517 displaying configuration parameters for a continuous shooting mode is shown on the UI 510 for the user to select and set, in the embodiment in FIG. 2, frame numbers per second is shown. When a press and hold is received on the shutter button 511 or the preview area 513, the processor 40 will, in block 24, control the camera unit 50 to take continuous shots based on the currently set parameters.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A device, comprising:
   a processor;
   a storage storing a predetermined pressure value and a plurality of instructions;
   a camera unit comprising a program, and when executed by the processor, the program rendering a user interface (UI) on the touch screen;
   a detecting unit; and
   a pressure-sensing touch screen,
   wherein the pressure-sensing touch screen senses pressure of a touch input; the detecting unit determines whether the pressure exceeds the predetermined pressure value and a type of the touch input, and feeds the processor with the determinations; and when the pressure is determined greater than the predetermined pressure value, the processor control the camera unit to either take pictures or display picture-taking parameters according to one or more of the instructions selected based on the type determination; and
   wherein the UI comprises a preview area when a pressure slide on the preview area is received and a trace of the slide is in a predetermined direction, the program renders a picture-taking menu on the UI displaying parameters for continuous shooting mode for being selected and set frame numbers per second is shown, when a press and hold on the preview area is received, the camera unit takes continuous shots based on the currently set parameters.

2. The device of claim 1, wherein the pressure-sensing touch screen comprises a touch-sensitive screen to receive the touch input, and a pressure-sensing screen to sense the pressure of the touch input.

3. The device of claim 2, wherein the pressure-sensing screen comprises a pressure-sensitive layer of carbon nanotubes.

4. The device of claim 2, wherein the UI comprises a shutter button; when a tap on the shutter button is received and it is determined that pressure of the tap is less than or equal to the predetermined pressure value, the camera unit focuses; when a pressure tap on the shutter button is received, the camera unit takes a single shot; and when press and hold on the shutter button is received, the camera unit takes continuous shots.

5. The device of claim 2, wherein the UI comprises a preview area; when a tap on the preview area is received and it is determined that pressure of the tap is less than or equal to the predetermined pressure value, the camera unit focuses; when a pressure tap on the preview area is received, the camera unit takes a single shot; when a press and hold on the preview area is received, the camera unit takes continuous shots.

6. A method for taking pictures using a device with a pressure-sensing touch screen wherein the device comprises a camera unit, comprising:
   receiving touch input from the touch screen;
   determining whether pressure from the touch input is greater than a predetermined pressure value, and a type of the touch input;
   when the pressure is determined greater than the predetermined pressure value, taking pictures or displaying a picture-taking menu based on the type determination;

rendering a user interface on the touch screen;
further rendering a preview area on the user interface;
when a pressure slide on the preview area is received and a trace of the slide is in a predetermined direction, rendering a picture-taking menu on the UI displaying parameters for continuous shooting mode for being selected and set frame numbers per second is shown, when a press and hold on the preview area is received, taking continuous shots based on the currently set parameters.

7. The method of claim 6, further comprising:
using a pressure-sensitive layer of carbon nanotubes for sensing the pressure.

8. The method of claim 6, further comprising:
rendering a shutter button on the user interface,
wherein the step of taking pictures or displaying the picture-taking menu based on the determinations comprises:
when a pressure tap on the shutter button is received, taking a single shot using the camera unit; and
when press and hold on the shutter button is received, taking continuous shots.

9. The method of claim 6, further comprising:
rendering a preview area on the user interface,
wherein the step of taking pictures or displaying the picture-taking menu by based on the determinations comprises:
when a pressure tap on the preview area is received, taking a single shot using the camera unit; and
when a press and hold on the preview area is received, taking continuous shots using the camera unit.

10. The method of claim 6, further comprising:
rendering a shutter button on the user interface; and
when a tap on the shutter button is received and it is determined that pressure of the tap is less than or equal to the predetermined pressure value, focusing the camera unit.

11. The method of claim 6, further comprising:
when a tap on the preview is received and it is determined that pressure of the tap is less than or equal to the predetermined pressure value, focusing the camera unit.

12. A pressure screen activated camera device, comprising:
a camera unit comprising a program, and when executed by the processor, the program rendering a user interface (UI) on the touch screen;
a processor for activating the camera unit;
a detecting unit providing instructions to the processor; and
a touch input sensing pressure sensing touch screen connected to the detecting unit,
wherein, when a user uses the camera device, the pressure-sensing touch screen senses a pressure the touch input of the user and provides the pressure to the detecting unit; and
wherein, the detecting unit compares the pressure of the touch input to pre-determined information and then instructs the processor based on the results of the comparison; and
wherein the UI comprises a preview area; when a pressure slide on the preview area is received and a trace of the slide is in a predetermined direction, the program renders a picture-taking menu on the UI displaying parameters for continuous shooting mode for being selected and set frame numbers per second is shown, when a press and hold on the preview area is received, the camera unit takes continuous shots based on the currently set parameters.

13. The device of claim 12, wherein the pressure-sensing touch screen comprises a pressure-sensitive layer of carbon nanotubes.

* * * * *